A. G. WILSON & C. O. OLESON.
WINDING ATTACHMENT FOR VEHICLE WHEELS.
APPLICATION FILED JUNE 30, 1916.
1,229,368. Patented June 12, 1917.
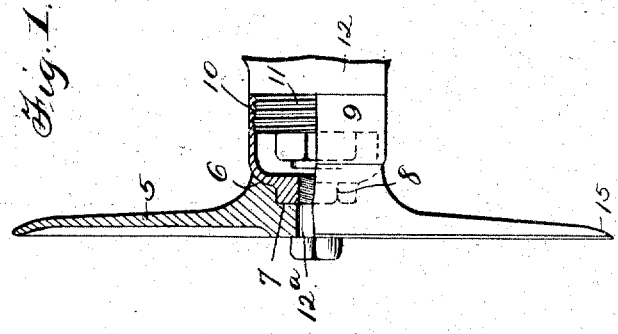
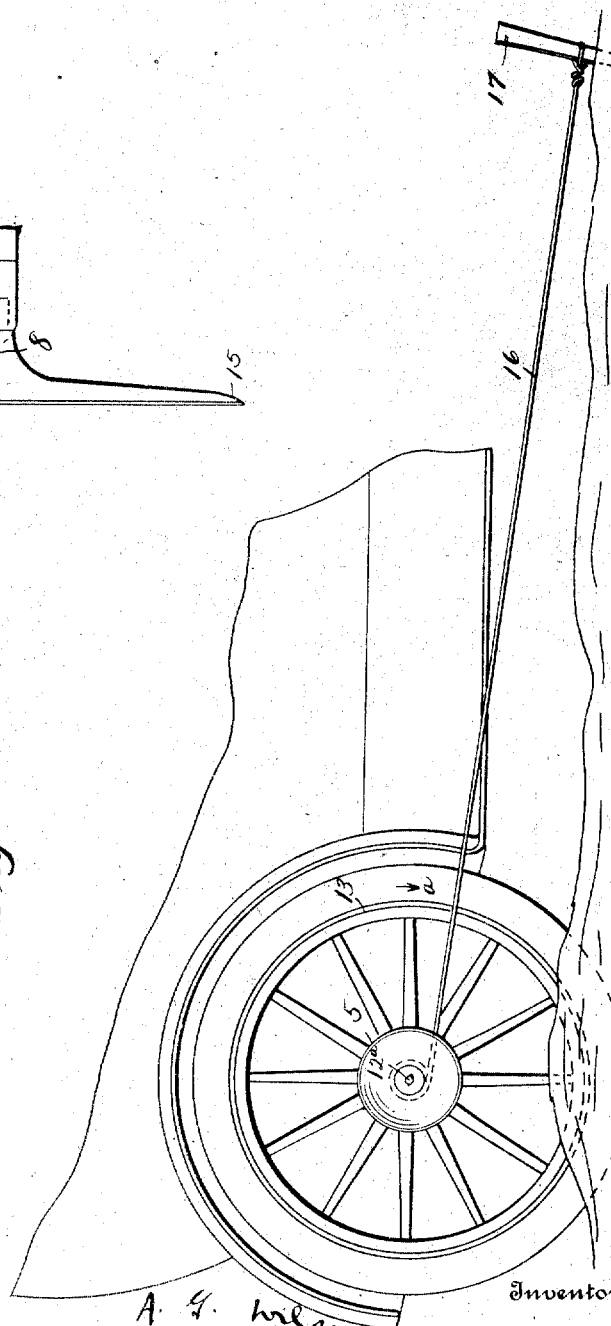

UNITED STATES PATENT OFFICE.

ARTHUR G. WILSON AND CARL OSCAR OLESON, OF VALLEY CITY, NORTH DAKOTA.

WINDING ATTACHMENT FOR VEHICLE-WHEELS.

1,229,368.  Specification of Letters Patent.  Patented June 12, 1917.

Application filed June 30, 1916. Serial No. 106,890.

*To all whom it may concern:*

Be it known that we, ARTHUR G. WILSON and CARL OSCAR OLESON, citizens of the United States of America, residing at Valley City, in the county of Barnes and State of North Dakota, have invented certain new and useful Improvements in Winding Attachments for Vehicle-Wheels, of which the following is a specification.

This invention relates to winding attachments for vehicle wheels and it has for its object the provision of an improved device of this nature constructed in such manner that it may be quickly attached to a vehicle wheel and when in position upon said wheel will so guide a rope or cable as to cause the latter to be wound upon the hub of the wheel, so that by attaching one end of the cable to a stake, post, tree or other fixed object at a point ahead of the vehicle, said vehicle may be pulled out of mud-holes or the like.

We are aware of the fact that it has heretofore been proposed to provide winding reels for this purpose but an inspection of the accompanying drawing and a perusal of the following description will make it clear that we do not contemplate the provision of any such reel but upon the contrary, we make the hub of the wheel serve as a winding drum and we merely provide a simple and inexpensive guide disk adapted to be secured to and be carried by the usual threaded hub cap of the wheel.

Further objects and advantages of the invention will be set forth in the detailed description which now follows.

In the accompanying drawing

Figure 1 is a view partly in edge elevation and partly in section of a guide disk and the associated hub cap, and Fig. 2 is a side elevation illustrating the application of the invention.

Like numerals designate corresponding parts in both of the figures of the drawing.

Referring to the drawing, it will be seen that the device forming the subject matter of the present invention consists of a disk 5. The rear face of this disk is provided with a recess 6 having an angular portion 7 which receives the corresponding angular portion 8 of a hub cap 9. This hub cap is of usual and well-known construction and it is internally threaded at 10 to adapt it to screw upon the threaded portion 11 of the hub 12 of a vehicle wheel 13. A bolt 12$^a$ passes through the disk 5 and screws into the hub cap 6 and by this bolt the disk is held upon the hub cap. The wheel may be a rear or driving wheel of a motor vehicle 14. The outer edges of disk 5 are outwardly curved at 15 to adapt them to guide a cable into the space lying inwardly of the disk so that the hub cap and hub are caused to constitute a winding drum upon which a cable 16 may be wound when power is imparted to the driving wheel 13 to cause it to rotate in the direction of the arrow $a$. If the end of the cable be attached to a stake 17 or other fixed object, it is apparent that the vehicle may, by the means shown, be drawn out of a mudhole.

It is to be understood that the invention is not limited to the precise construction set forth but that such changes and modifications may be resorted to as fairly come within the spirit of the appended claims.

Having described our invention what we claim is:

1. The combination with a vehicle wheel having a hub, said hub including a hub cap, of a disk of much greater diameter than the hub cap and means for securing said disk to said hub cap, in such position that the disk serves to guide a cable upon said hub cap and hub.

2. In the device of the character described, the combination with the hub cap having an angular portion, of a disk of much greater diameter than the hub cap having an angular recess to fit upon said portion and means traversing said disk and the hub cap for holding the disk upon the hub cap.

In testimony whereof we affix our signatures in the presence of two witnesses.

ARTHUR G. WILSON.
C. OSCAR OLESON.

Witnesses to Arthur G. Wilson's signature:
H. A. OLSBERG,
JOSEPHINE EFTELAND.

Witnesses to C. Oscar Oleson's signature:
T. F. RODDLO,
P. H. LEE.